(12) United States Patent
Schlegl et al.

(10) Patent No.: US 6,527,072 B1
(45) Date of Patent: Mar. 4, 2003

(54) TRACKED VEHICLE WITH DRIVE UNIT

(75) Inventors: Bernhard Eugen Schlegl, Grobenzell (DE); Harald Westermann, Schwabhausen (DE)

(73) Assignee: Kraus-Maffei Wegmann GmbH & Co., Kassel (DE)

( * ) Notice: Subject to any disclaimer, the term of this patent is extended or adjusted under 35 U.S.C. 154(b) by 0 days.

(21) Appl. No.: 09/787,636

(22) PCT Filed: Sep. 27, 1999

(86) PCT No.: PCT/DE99/03123
§ 371 (c)(1), (2), (4) Date: Mar. 20, 2001

(87) PCT Pub. No.: WO00/20245
PCT Pub. Date: Apr. 13, 2000

(30) Foreign Application Priority Data

Oct. 2, 1998 (DE) .......................... 198 45 494

(51) Int. Cl.⁷ ............................................. B62D 55/125
(52) U.S. Cl. ........................................ 180/9.1; 180/9.62
(58) Field of Search .................. 180/9.1, 9.5, 9.54, 180/9.62, 9.64, 6.48, 6.5, 6.7, 361

(56) References Cited

U.S. PATENT DOCUMENTS

| 4,171,027 A | * | 10/1979 | Seit et al. | 180/9.54 |
|---|---|---|---|---|
| 4,226,292 A | * | 10/1980 | Monte et al. | 180/6.5 |
| 4,687,071 A | * | 8/1987 | Hartz et al. | 180/9.1 |
| 4,893,687 A | * | 1/1990 | Simmons | 180/9.1 |
| 5,363,937 A | * | 11/1994 | James | 180/192 |
| 5,697,463 A | * | 12/1997 | Schlegl | 180/6.5 |
| 5,785,395 A | * | 7/1998 | Crabb | 305/138 |

FOREIGN PATENT DOCUMENTS

| DE | 2555021 | * | 6/1977 |
|---|---|---|---|
| DE | 3725920 | * | 2/1989 |
| DE | 4123778 | * | 4/1992 |

* cited by examiner

Primary Examiner—Anne Marie Boehler
(74) Attorney, Agent, or Firm—Chadbourne & Parke, LLP

(57) ABSTRACT

The invention relates to a tracked vehicle (10) comprising tracks (38) which are driven, a drive unit (28, 28) for each driven track (38), containing a drive wheel (52) which engages in said track (38), an electric motor (18, 20), a drive train (30, 32) which is connected before the drive wheel (52), and a shaft (34, 36) which driveably interconnects the electric motor (18, 20) and the drive train (30, 32). The inventive tracked vehicle also comprises a vehicle pan (12) which supports each drive unit (26, 28) on a wall (40, 42). The invention is characterized in that vibration damping means (44) are interconnected between the wall (40, 42) and the drive unit (26, 28) so that the drive unit (26, 28) is vibrationally isolated from the wall (40, 42) of the vehicle pan (12).

22 Claims, 10 Drawing Sheets

TRACKED VEHICLE WITH DRIVE UNIT

The present invention relates to a tracked vehicle as recited in the preamble to claim 1.

Tracked vehicles of this type are known not only for civilian applications, as construction machinery for example, but also in the military, as armored combat vehicles for example.

A tracked vehicle of the present type features as a rule two lateral tracks mounted around a wheelset and separately driven by drive wheels. Each drive wheel is part of a drive unit associated with each track. Each drive unit also includes an electric motor, a drive train upstream of the drive wheel, and a shaft that drivingly connects the electric motor to the drive train. The drive units and the wheelset is mounted directly against the vehicle's pan, the electric motors on its inner surface and the chain drives on its outer surface. The shaft extends through the vehicle pan and drives the drive train, a planetary gear. The drive train drives the drive wheels, and the drive wheels the tracks. The drive train is mounted directly to the outer surface of the vehicle pan.

There are problems with this embodiment. The drive mechanisms can cause vibrations in the tracks. Irregularities in the terrain can also lead to such vibrations, that can be transmitted to the wheelset and drive wheels and eventually to the vehicle pan. The vibrations can seriously disturb the driver and crew by subjecting them to constant jolting.

The vibrations can also severely damage the optical devices in an armored combat vehicle.

The situation is aggravated because, since the electric motor is part of a drive unit, the stator must be as close as possible to the rotor to ensure high efficiency. Since, however, the vibrations are induced directly into the rotor and transmitted to the stator, the electric motor can fail when the stator and rotor do not vibrate synchronized but interfere with each other.

Bearing for another design of tracked vehicle is known from generic German 2 555 021 A. In this system a track drive wheel and a drive train are accommodated in one of the vehicle pan's walls. Another drive train is accommodated separately along with a drive unit inside the vehicle pan and are connected by a universal shaft. There is a drawback to this system in that vibrations can also be transmitted into the vehicle pan by way of shaft, the drive train, and the drive unit. Furthermore, the drive mechanism is very rigid and takes up a lot of room inside the vehicle. This tracked vehicle is to this extent of a different type.

The object of the present invention is accordingly to improve a tracked vehicle of the type recited in the preamble to claim 1 to the extent that it will not have the aforesaid drawbacks and that vibrations induced in the drive wheels by way of the tracks will not be transmitted to the vehicle pan.

This object is attained in accordance with the present invention in a tracked vehicle of the aforesaid type by the characteristics recited in the body of claim 1.

The present invention derives from the awareness that vibrationally separating the drive unit comprising the drive wheel, drive train, shaft, and electric motor from the assembly's accommodation, specifically the vehicle pan, will allow simple means of preventing drive train of the vibrations.

Means of damping vibrations are accordingly interposed in accordance with the present invention between the walls of the vehicle pan and the drive unit, vibrationally separating them.

The vibration-damping means in one embodiment are mounted on one surface of the walls, specifically on either the outer surface or the inner surface. To run the tracks as close to the walls of the vehicle pan as possible for example, the vibration-damping means will be mounted on their inner surface, allowing some of the drive unit to be installed inside the vehicle pan. If on the other hand it is desired to provide as much space as possible inside the vehicle pan, it will be of benefit to mount the vibration-damping means on the outer surface. The whole drive unit can in this event be accommodated outside the vehicle pan.

The vibration-damping means can as an alternative be mounted on both the inner surface and the outer surface. This approach will allow part of the drive unit to be accommodate inside the vehicle pan and part outside. The vibration-damping means can then be fine-tuned to the particular vibrations that occur, the interior means being provided with a damping factor that differs from that of the exterior means.

The drive train and the electric motor in each drive unit can each be provided with a static component and a rotating component. Either the static component of the drive train or the static component of the electric motor or both are connected to the vibration-damping means.

In one embodiment the static component of the electric motor is connected to the vibration-damping means on the inner surface and the static component of the drive train to the vibration-damping means on the outer surface of the walls of the vehicle pan. This arrangement allows early vibration damping and prevents drive train of the vibrations into the drive unit.

The static components of the electric motors and drive trains in one embodiment are rigidly interconnected, at least one static component connected to the walls by way of vibration-damping means. This approach provides a simple means of preventing relative motions on the part of the static components and hence of the rotating components as well.

The static components of the drive train and of the electric motor can alternatively be connected by way of means of transmitting torque, allowing compensation of radial and axial motions of the static components relative to each other. Such relative motions sometimes occur in operation as the result of sudden stress on the tracks due to irregularities in the terrain.

For particular applications it may be necessary to accommodate the electric motor on one side and either the drive wheel or the drive train on the other as far apart as possible.

In this event it will be of advantage to provide one or more particularly loosely accommodated components to rigidly connect the static components of the electric motor and of the drive train and to span the distance between them.

The components that span the distance can in particular be part of the static component of the electric motor and/or the drive train.

To prevent the rotating components from jamming, the shaft of the drive unit is connected to the rotating component of the electric motor and/or to the rotating component of the drive train by means for compensating radial and axial motions of the shaft relative to the rotating component of the electric motor and of the drive train.

This arrangement will protect the electric motor, which as hereinbefore described has a narrow gap between its rotor and stator, between, that is, its rotating component and its static component.

The drive train in one embodiment of the present invention includes a planetary gear, the shaft of the drive unit constituting the shaft of a sunwheel in the planetary gear. This arrangement allows immediate drive train of forces and decreases the number of necessary components.

The range of possible embodiments can be extensively increased if the drive train comprises an axially offset drive train. Electric motors with long diameters can then be employed for example, in that it is well known that the diameter participates quadratically and the length of the electric motor or its coil linearly in torque. Electric motors with long diameters must accordingly be installed displaced from their ideal location due to the limited amount of space available, in armored combat vehicles in particular, a demand that is easily satisfied when the drive train is axially offset.

Assembly can be facilitated when the axially offset drive train and the electric motor constitute a single module.

To protect the vehicle pan and the sensitive equipment accommodated therein from vibrations, the vehicle's wheelset can also be vibrationally uncoupled from the vehicle pan. Assembly can in this event be facilitated if at least some of the vibration-damping means in the drive unit and the wheelset constitute a single module.

One embodiment of the present invention features motion-limiting means that prevent large relative motions between the drive unit and the walls of the vehicle pan.

To expand the range of possible approaches to accommodating the drive unit in the vehicle pan, the vehicle pan is provided with a cutout associated with part of the drive unit.

To protect it from exterior mechanical action, the electric motor can be entirely accommodated on one surface of the walls, especially on the inner surface.

It will be of advantage for the same reason for the drive train to extend at least partly into the vehicle pan.

Further advantages and characteristics will be evident from the following specification of several embodiment of the present invention with reference to the accompanying drawing, wherein.

Figure 1:
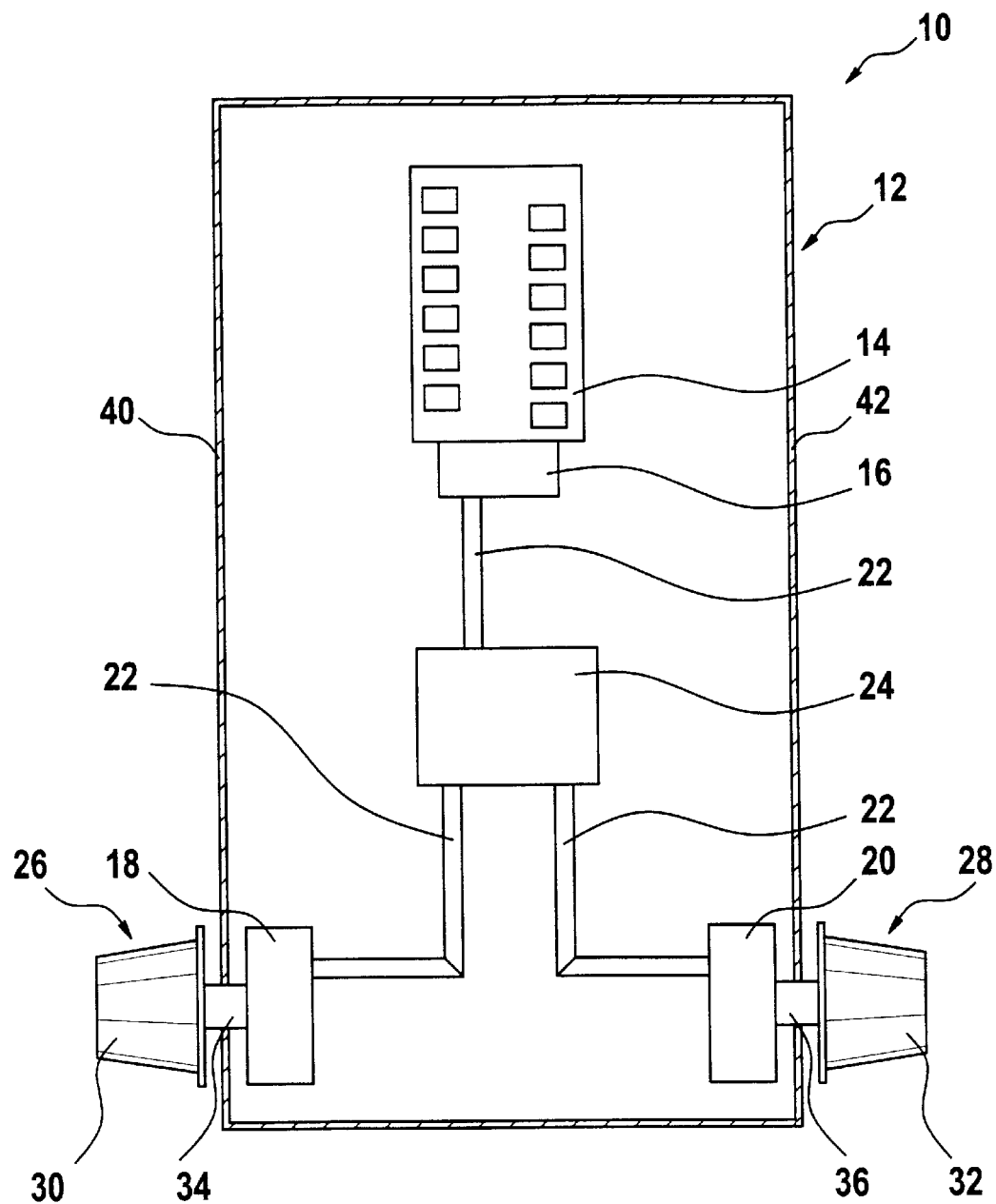
FIG. 1 is a schematic illustration of a drive unit accommodated in a vehicle vehicle pan along with a diesel drive and electric controls in principle.

FIG. 1 is a schematic illustration in principle of part of a tracked vehicle 10, an armored combat vehicle for instance. Vehicle 10 is conventionally provided with a vehicle pan 12 that accommodates a Diesel motor 14. Motor 14 drives a generator 16 that provides electric current for electric motors 18 and 20, to which it is connected by lines 22. Interposed between generator 16 and electric motors 18 and 20 are electric controls 24.

Electric motor 18 is part of a drive unit 26 that also includes a lateral power train 30 connected to the electric motor by a shaft 34. Electric motor 20 is part of a similar drive unit 28 that includes a lateral power train 32 connected to the electric motor by a shaft 36.

Each drive unit 26 and 28 drives a track 38 (FIGS. 2–11). Each track is mounted around and guided by unillustrated wheelset.

Vehicle pan 12 is provided with two walls 40 and 42. Drive unit 26 is mounted on wall 40 and drive unit 28 on wall 42, embedded in the walls.

Drive assemblies 26 and 28 are identical in design and identically fastened to their associated walls 40, 42.

FIGS. 2 through 10 accordingly illustrate only drive unit 26 and how it is fastened to wall 40.

Drive unit 26 is vibrationally uncoupled from the vehicle pan 12 by damping means 44 interposed between them.

Figure 2:
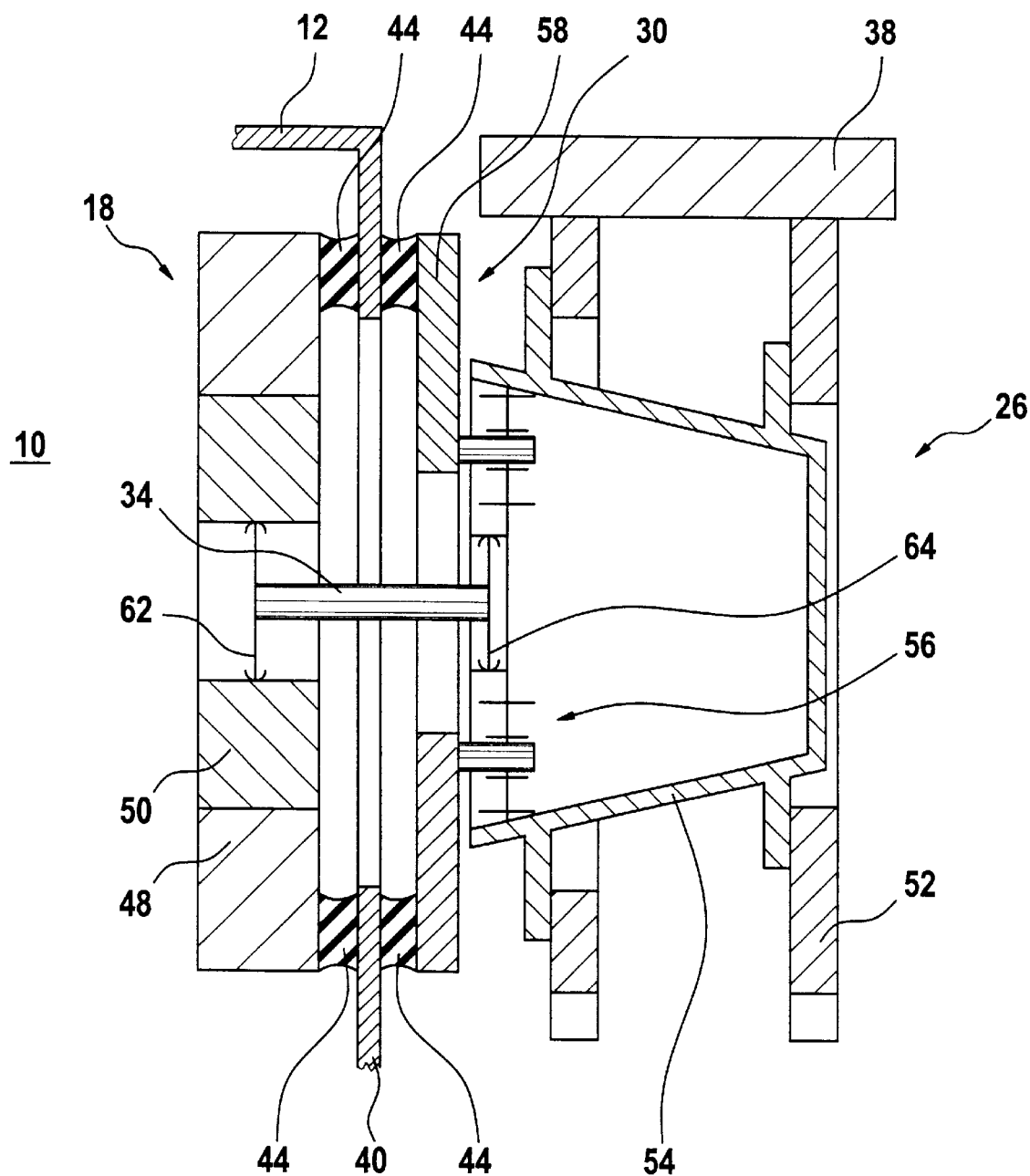
FIG. 2 is a schematic lateral section through the drive unit accommodated in the vehicle pan in one embodiment of the present invention.

The embodiment of the present invention illustrated in FIG. 2 includes a round cutout 46 with damping means 44 in the form of elastomer rings at the side.

Electric motor 18 comprises a static component 48 and a rotating component 50. Static component 48 essentially consists of a stator, a bearing for a rotor, and a motor housing, and rotating component 50 the rotor itself.

Lateral power train 30 includes a cogged drive wheel 52 fastened to a drum 54 and engaging track 38. Drum 54 is driven by a planetary gear 56 that is also connected to shaft 34. Lateral power train 30 accordingly constitutes a drive train that transmits driving action from shaft 34 to drive wheel 52.

Lateral power train 30 also comprises a static component 58 and a rotating component 60. Static component 58 essentially consists of a bearing for planetary gear 56 and of a power-train housing. Rotating component 60 consists of the cogwheels in planetary gear 56 and of power-train drum 54.

As hereinbefore specified, damping means 44 in the form of an elastomer ring are mounted on the inner surface of vehicle pan 12 in the vicinity of cutout 46. Connected to this point is the static component 48 of electric motor 18. Damping means 44 in the form of an elastomer ring are also mounted in the vicinity of cutout 46 on the outer surface of the wall 40 of vehicle pan 12. The static component 58 of the lateral power train. Drive unit 26 is accordingly vibrationally uncoupled from vehicle pan 12.

Shaft 34 is connected to the rotating component 50 of the electric motor by way of a universal joint 62 and to the lateral power train's annular connection by way of another universal joint 64. The universal connection allows drive train of the electric motor's torque while equilibrating relative axial and radial motions between shaft 34 and rotating component 50 and between shaft 34 and the rotating component 60 of lateral power train 30.

Damping means 44 are designed to accommodate any moments that need to be transmitted. Motion-limiting means in the form of rigid stops can be provided for more powerful moments.

Figure 3:
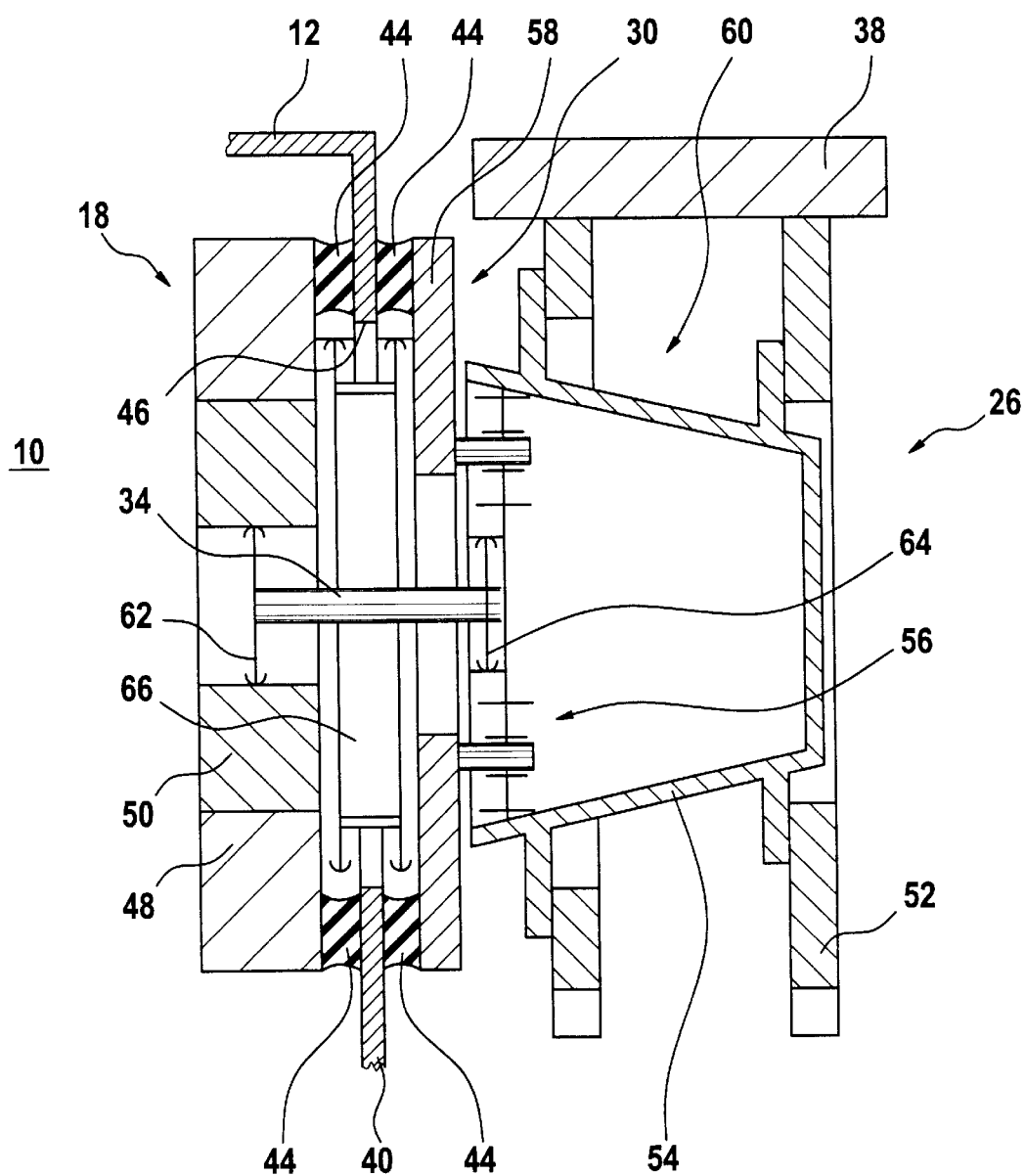
FIG. 3 is a schematic lateral section through the drive unit accommodated in the vehicle pan in another embodiment of the present invention.

FIG. 3 is a section through a second embodiment of the present invention, which differs from the first, illustrated in FIG. 2, in that static components 48 and 50 are interconnected above cutout 46 by way of a torque transmitter 66 that extends through the cutout 46 in the wall 40 of vehicle pan 12. Torque transmitter 66 transmits only torque and not the axial or radial motions of static components 48 and 58 relative to each other.

This arrangement ensures that damping means 44 will be uniformly stressed and relieved of torque, even though their vibrational insulation from vehicle pan 12 remains completely intact. The proportion of vibrations transmitted to each other by rotating components 50 and 60 will also be decreased.

Figure 4:
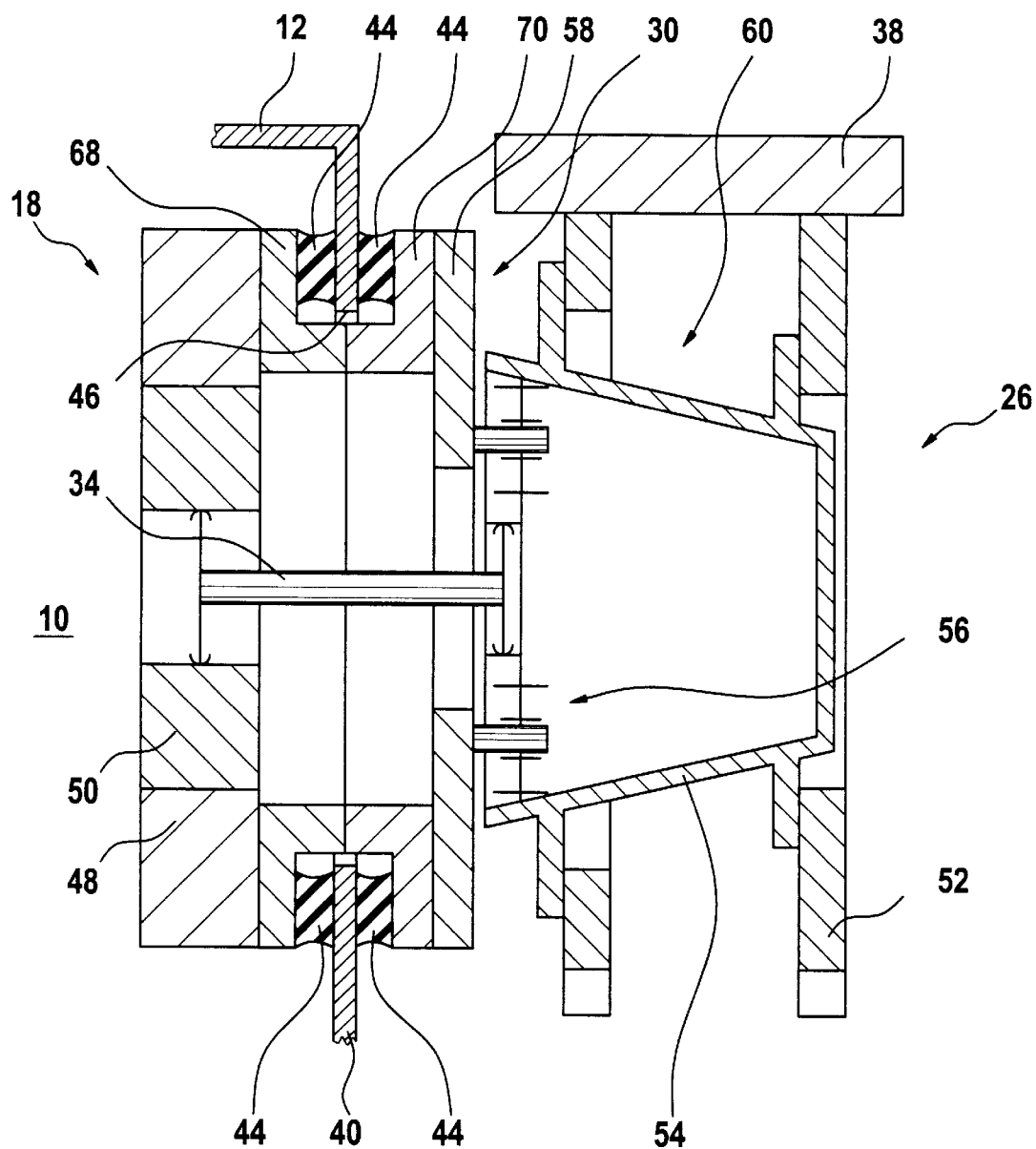
FIG. 4 is a schematic lateral section through the drive unit accommodated in the vehicle pan in a third embodiment of the present invention.

FIG. 4 is a schematic section through a third embodiment of the present invention. Here, static components 48 and 58 are rigidly connected above cutout 46 by two annular spacers 68 and 70. This embodiment, in contrast to the one illustrated in FIG. 3, lacks the universal joint between rotating components 50 and 60. Since electric motor 18 and lateral power train 30 cannot move relatively to each other, a simple plug-in shaft 34 for example will suffice for transmitting torque from electric motor 18 to planetary gear 56.

Annular spacers 68 and 70 increase the range of possible embodiments. Electric motor 18 and lateral power train 30 can for instance be separated by prescribed distances. The rigid connection between static components 48 and 50 can be disestablished for assembly. Electric motor 18 is accommodated inside, and lateral power train 30 outside, vehicle pan 12.

Figure 5:
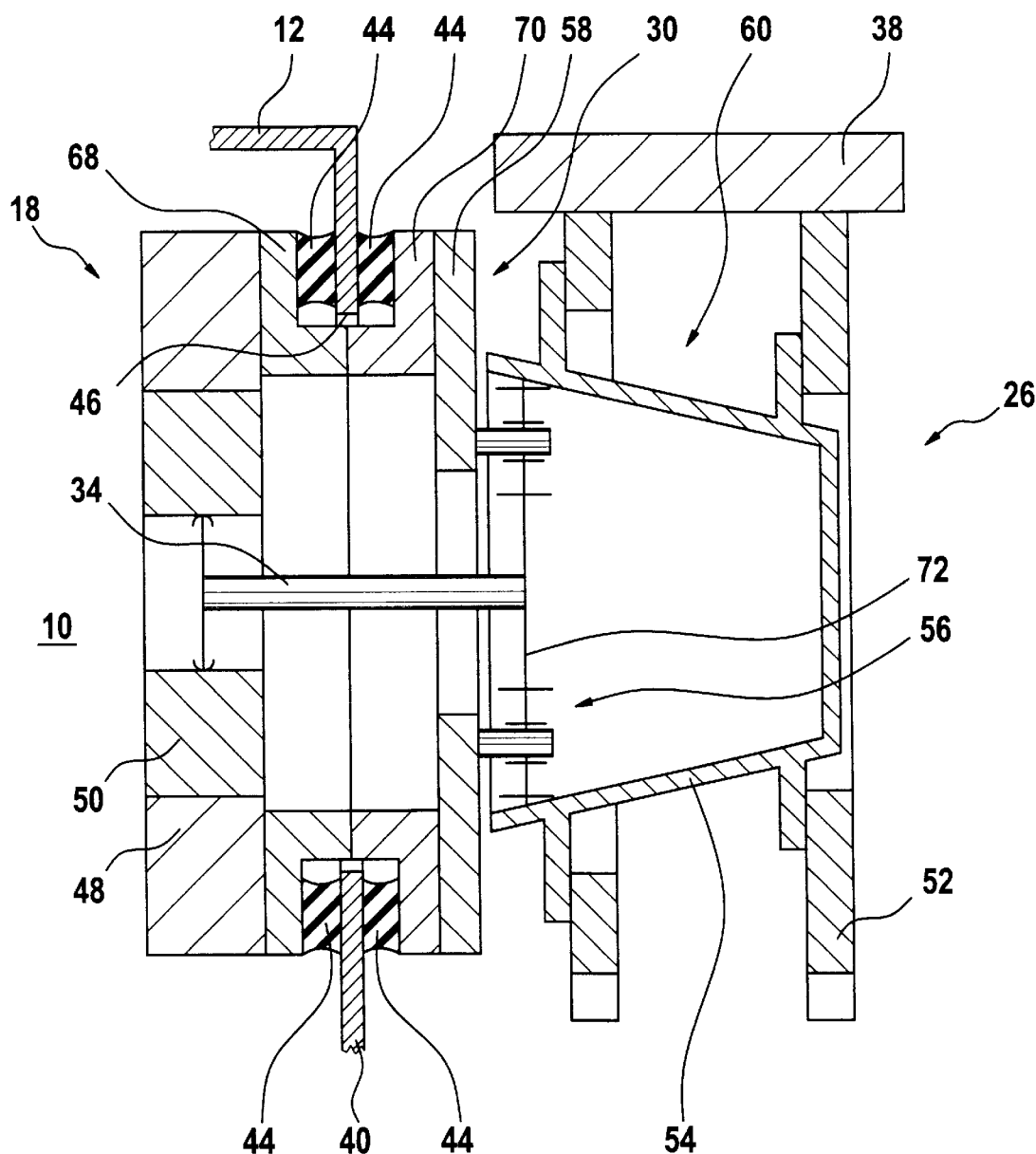
FIG. 5 is a schematic lateral section through the drive unit accommodated in the vehicle pan in a fourth embodiment of the present invention.

FIG. 5 is a section through a fourth embodiment of the present invention that differs from the third, illustrated in FIG. 4, in that the shaft 34 of the electric motor 18 simultaneously constitutes the shaft of the sunwheel 72 in planetary gear 56, simplifying manufacture.

Figure 6:
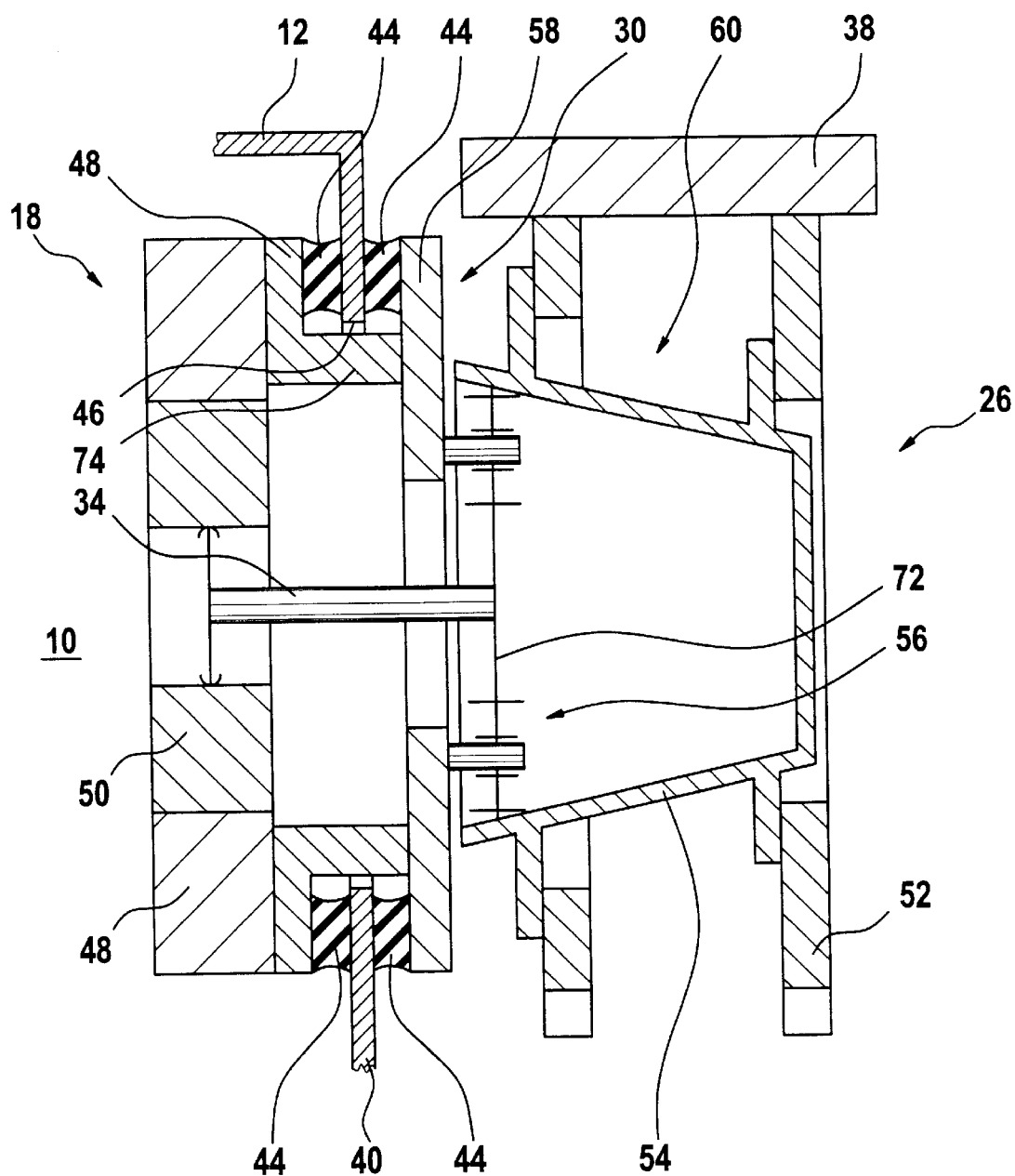
FIG. 6 is a schematic lateral section through the drive unit accommodated in the vehicle pan in a fifth embodiment of the present invention.

FIG. 6 is a schematic section through a fifth embodiment that differs from the fourth embodiment illustrated in FIG. 5 in that the static component 48 of electric motor 18 is provided with, instead of annular spacers 68 and 70, a projection 74 that rests tight against the static component 58 of the lateral power train. A decrease in the number of necessary components can accordingly be facilitated.

Figure 7:
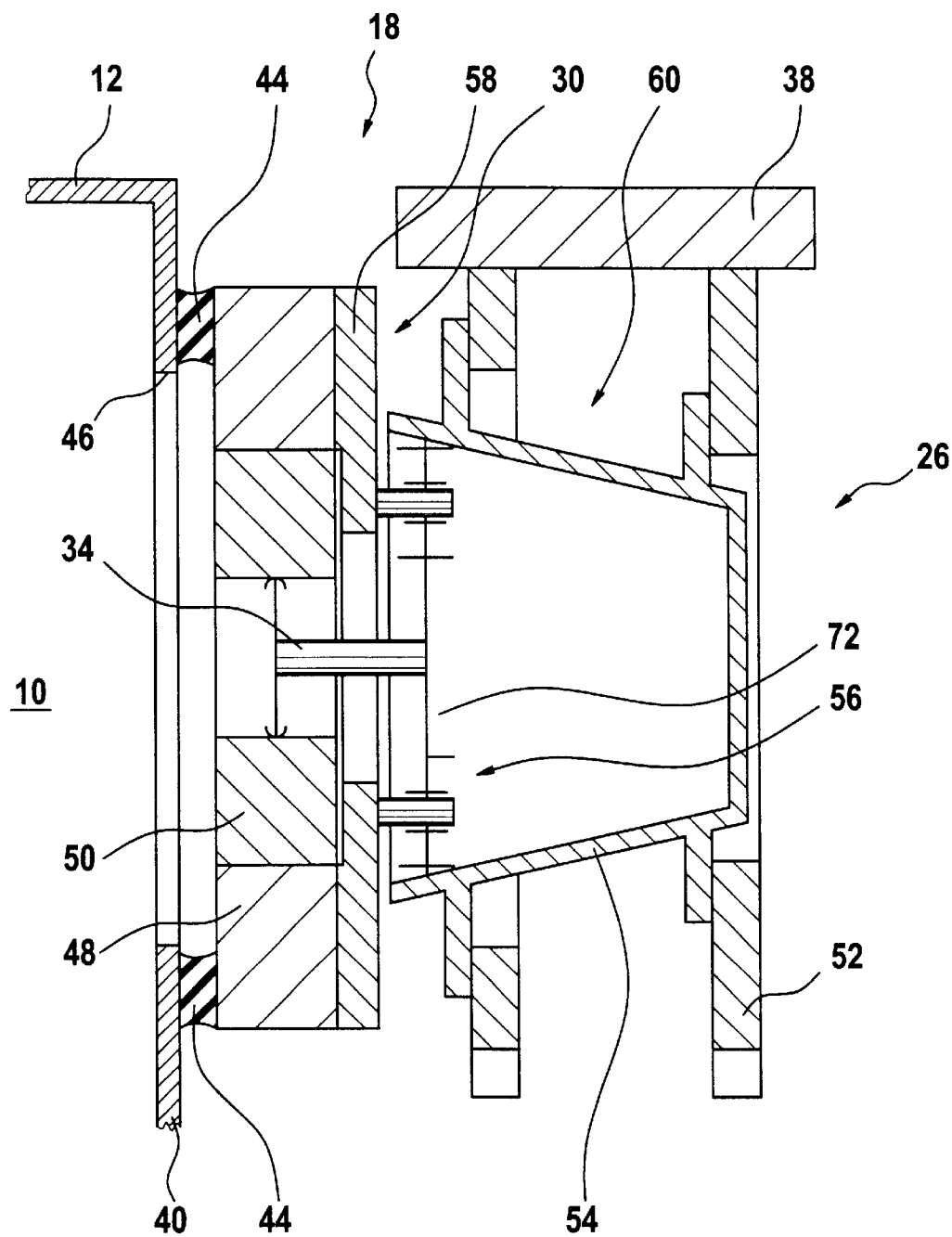
FIG. 7 is a schematic lateral section through the drive unit accommodated in the vehicle pan in a sixth embodiment of the present invention.

FIG. 7 is a schematic section through a sixth embodiment. Here, the damping means 44 in the form of an elastomer ring in the vicinity cutout 46 are applied to wall 40 outside vehicle pan 12. The static component 48 of electric motor 18 is connected to damping means 44. The static component 58 of lateral power train 30 is mounted on static component 48. Drive unit 26 is identical in design to those in the embodiment hereintofore specified. There is no need in the present embodiment for cutout 46 in that the only openings needed are those for the lines 22 that supply electric motor 18. Furthermore, the whole drive unit 26 can be outside vehicle pan 12.

Figure 8:
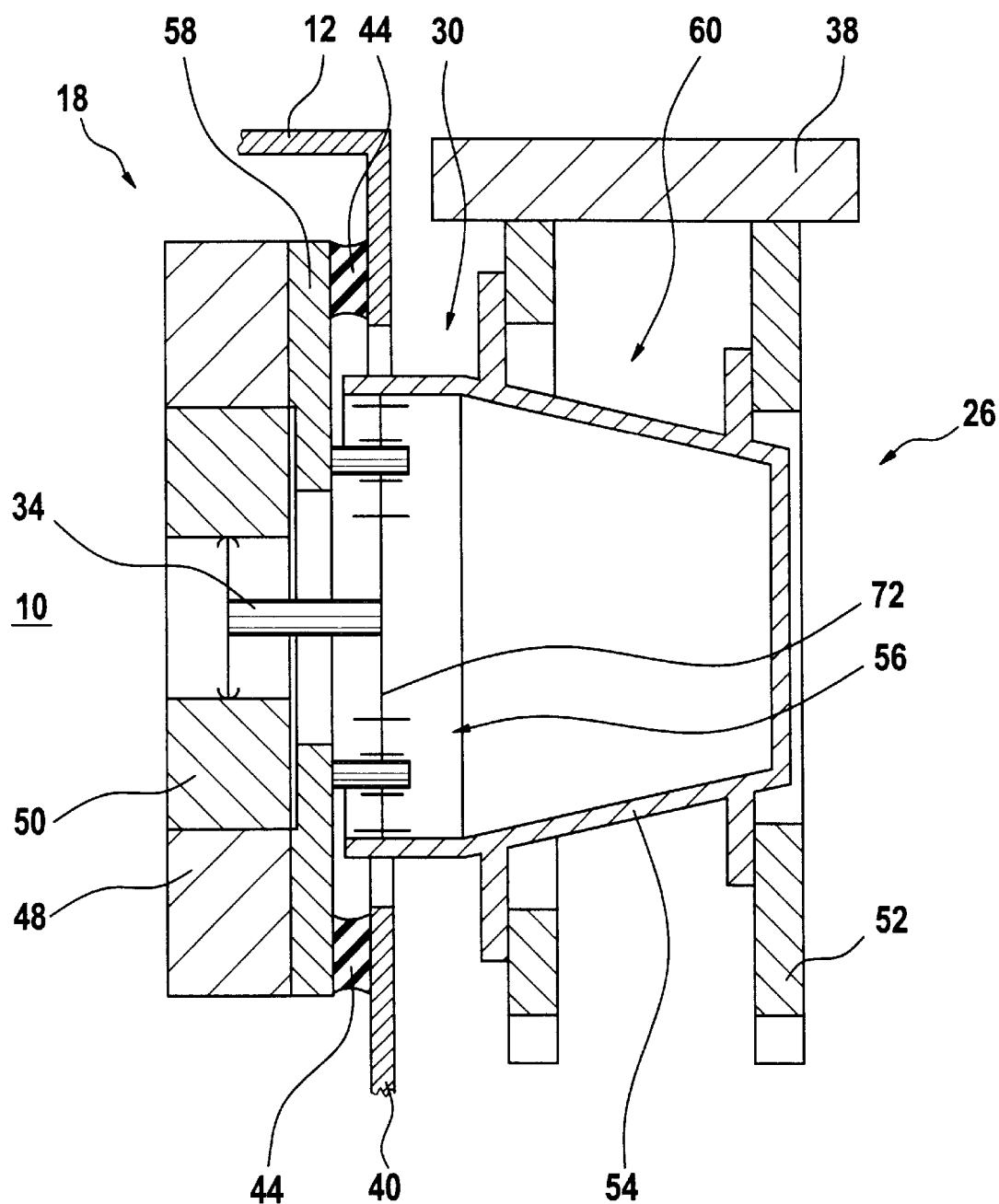
FIG. 8 is a schematic lateral section through the drive unit accommodated in the vehicle pan in a seventh embodiment of the present invention.

FIG. 8 is a schematic section through a seventh embodiment of the present invention. In contrast to the sixth embodiment, illustrated in FIG. 7, damping means 44 are here mounted on the inner surface of vehicle pan 12, next to circular cutout 46, and the static component 58 of lateral power train 30 is connected above to the vehicle pan. Otherwise, the embodiment is identical in design to the embodiment illustrated in FIG. 7. Drum 54 and drive unit 26 are accordingly accommodated further inside vehicle pan 12 and track 38 nearer wall 40. Hence, the vehicle pan 12 of a tracked vehicle 10 of any prescribed width can be as wide as possible. The cutout 46 in this embodiment is the same size as lateral power-train drum 54.

Furthermore, drum 54 is not conical over its total length, but has a cylindrical section at the rear that extends it while taking up no additional space.

Figure 9:
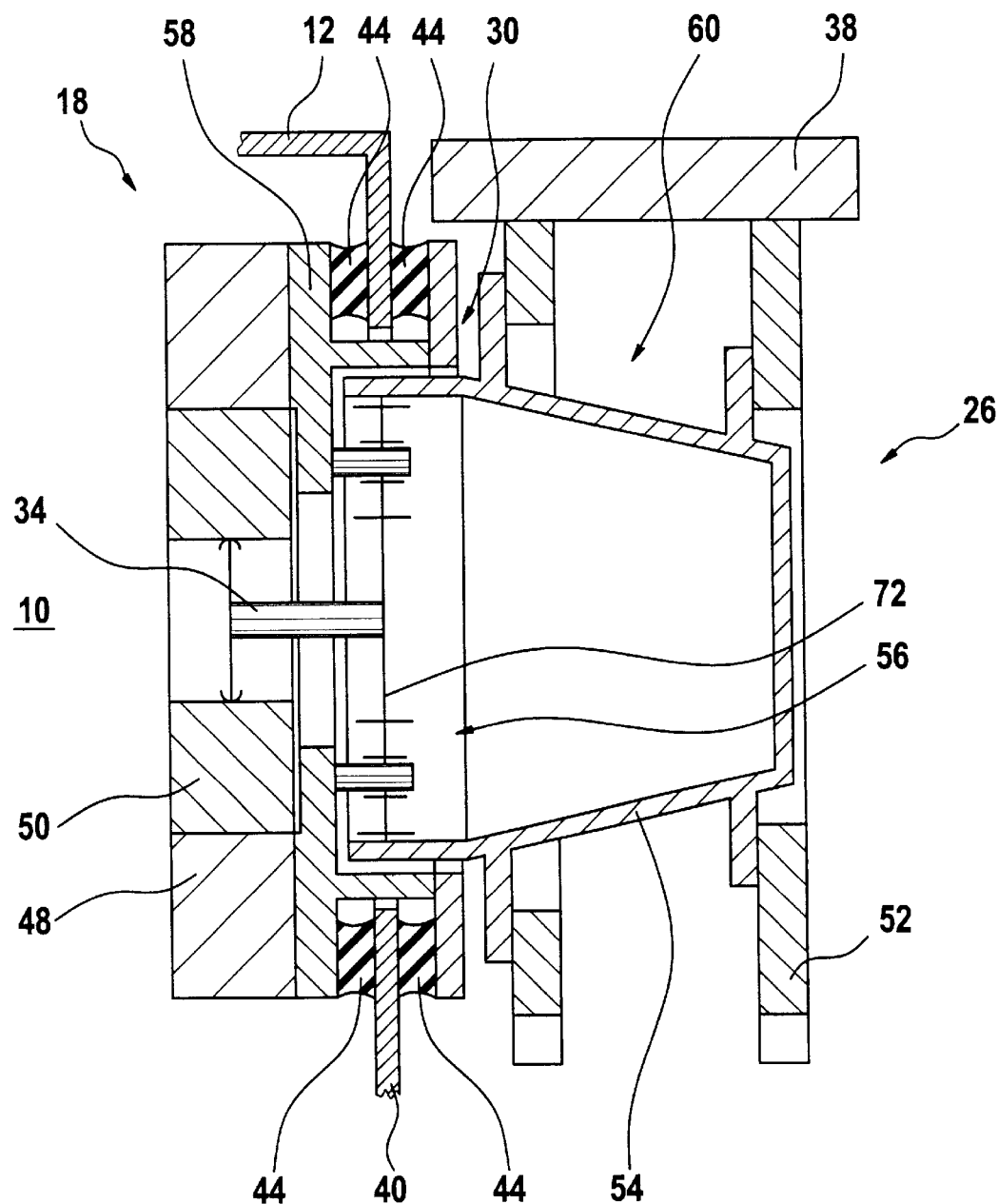
FIG. 9 is a schematic lateral section through the drive unit accommodated in the vehicle pan in an eighth embodiment of the present invention.

FIG. 9 is a schematic section through an eighth embodiment of the present invention.

The damping means 44 in this embodiment as well are mounted on both the inner and the outer surface of vehicle pan 12. Lateral power train 30 extends through cutout 46 and, in the shape of a U, embraces damping means 44, and the whole drive unit 26 is accordingly connected to vehicle pan 12 by way of lateral power train 30.

Otherwise, this embodiment is similar to the embodiment illustrated in FIG. 8.

Figure 10:
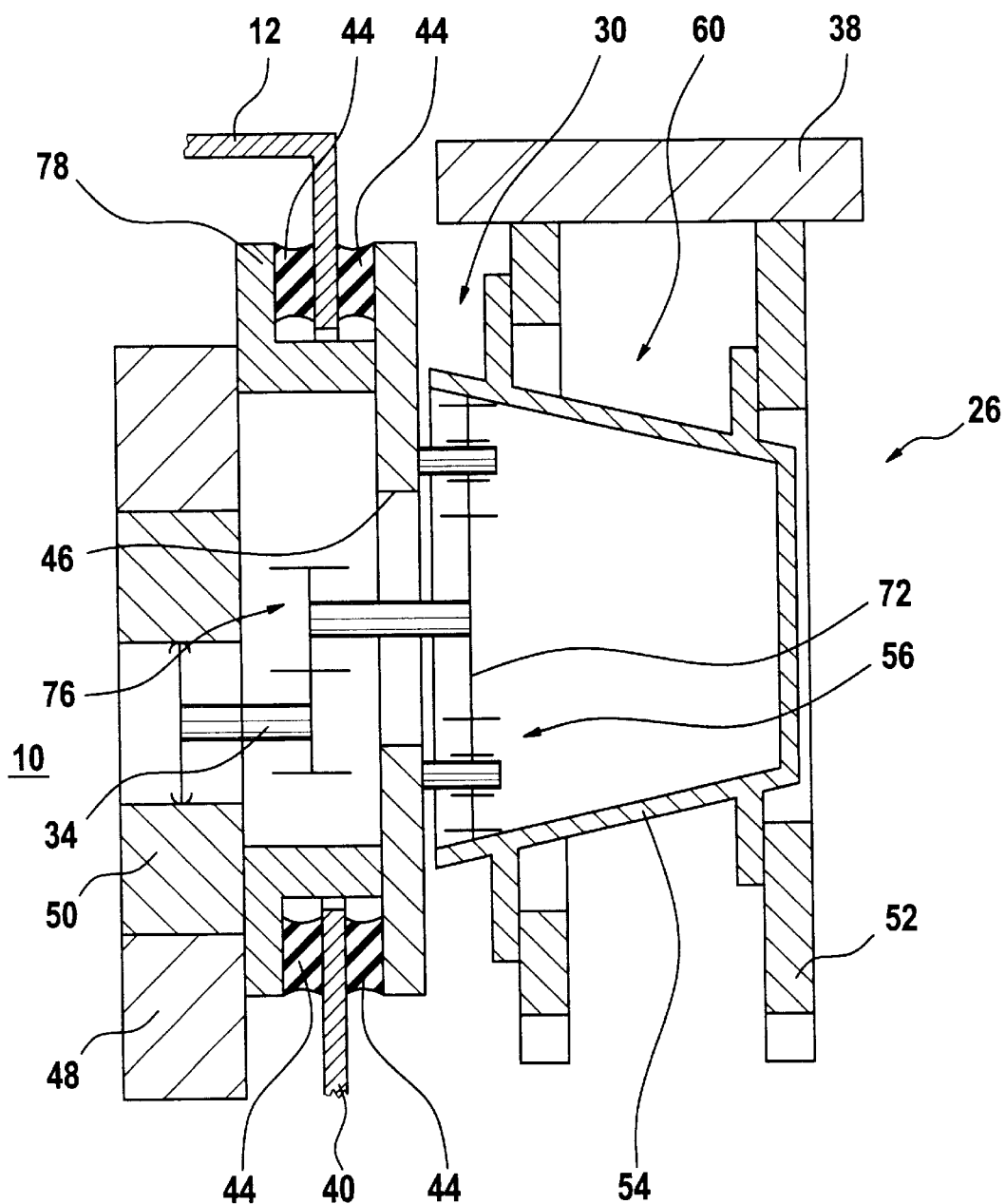
FIG. 10 is a schematic lateral section through the drive unit accommodated in the vehicle pan in a ninth embodiment of the present invention.

FIG. 10 is a schematic section through a ninth embodiment of the present invention with an axially offset drive train 76 between electric motor 18 and lateral power train 30 that drives planetary gear 56. Shaft 34 connects axially offset drive train 76 to electric motor 18. To facilitate assembly, electric motor 18, shaft 34, and drive train 76 constitute a module.

As in the embodiment hereintofore specified with reference to FIG. 9, the damping means 44 are on both surfaces of wall 40. Also provided is an annular spacer 78 connecting interior damping means 44 and the static component 48 of electric motor 18 and the static component 58 of lateral power train 30.

The present invention is outstanding for its simple approach to vibrationally uncoupling drive unit 26 from vehicle pan 12 and for the accordingly wide range of possible ways of accommodating the separate components of the drive unit in vehicle pan 12.

List of Parts

10. Tracked Vehicle
12. Vehicle pan
14. Diesel Motor
16. Generator
18. Electric Motor, Left-Hand
20. Electric Motor, Right-Hand
22. Line
24. Electronic Controls
26. Drive unit, Left-Hand
28. Drive unit, Right-Hand
30. Lateral Power Train, Left-Hand
32. Lateral Power Train, Right-Hand
34. Shaft, Left-Hand
36. Shaft, Right-Hand
38. Track
40. Left-Hand Wall Of Vehicle pan
42. Right-Hand Wall Of Vehicle pan
44. Damping Means
46. Cutout
48. Electric Motor's Static Component
50. Electric Motor's Rotating Component
52. Drive wheel
54. Lateral Power-Train Drum
56. Planetary Gear
58. Static Component Of Lateral Power Train (Drive train)
60. Rotating Component Of Lateral Power Train (Drive train)
62. Universal Connection
64. Universal Connection
66. Torque Transmitter
68. Annular Spacer, Left-Hand
70. Annular Spacer, Right-Hand
72. Sunwheel
74. Projection
76. Axially Offset Drive train
78. Annular Spacer

What is claimed is:

1. Tracked vehicle (10) with driven tracks (38), with a drive unit (26, 28) for each track (38) and comprising a drive wheel (52) that engages the track (38), an electric motor (18, 20), a drive train (30, 32) upstream of the drive wheel (52), and a shaft (34, 36) that drivingly connects the electric motor (18, 20) to the drive train (30, 32), and with a vehicle pan (12) with walls (40, 42) that the drive units (26, 28) are mounted on, whereby vibration-damping means (44) are interposed between the walls (40, 42) and the drive train (30, 32), characterized in that the overall drive unit (26, 28) is mounted on the wall (40, 42), whereby the drive train (30, 32) and the electric motor (18, 20) each comprise a static component (48, 58) and a rotating component (50, 60) and the static component (48, 58) of the drive train (30, 32) and/or of the electric motor (18, 20) are connected to the walls (40, 42) such that the overall drive unit (26, 28) is vibrationally uncoupled from the walls (40, 42) of the vehicle pan (12).

2. Tracked vehicle as in claim 1, characterized in that the vibration-damping means (44) are mounted on one surface of the walls (40, 42).

3. Tracked vehicle as in claim 2, characterized in that the vibration-damping means (44) are mounted on the outer surface of the walls (40, 42).

4. Tracked vehicle as in claim 2, characterized in that the vibration-damping means (44) are mounted on the inner surface of the walls (40, 42).

5. Tracked vehicle as in claim 1, characterized in that the vibration-damping means (44) are mounted on both the inner surface and the outer surface of the walls (40, 42).

6. Tracked vehicle as in claim 5, characterized in that the static component (48) of the electric motor (18, 20) is connected to the vibration-damping means (44) on the inner surface and the static component (58) of the drive train (30, 32) to the vibration-damping means (44) on the outer surface of the walls (40, 42) of the vehicle pan (12).

7. Tracked vehicle as in any preceding claim, characterized in that the static components (48, 58) of the electric motor (18, 20) and drive train (30, 32) are rigidly interconnected.

8. Tracked vehicle as claim 7, characterized in that at least one of components (68, 70, 74, 78) is provided to rigidly connect at least one of said static components (48, 58) of the electric motor (18, 20) and of the drive train (30, 32), and to span the distance between said static components (48, 58).

9. Tracked vehicle as in claim 8, characterized in that the components that span the distance are part of the static component (48, 58) of the electric motor (18, 20).

10. Tracked vehicle as in one of claims 1 through 6, characterized in that the static components (48, 58) of the drive train (30, 32) and of the electric motor (18, 20) are connected by torque-transmitting means (66), allowing compensation of radial and axial motions of the static components (48, 58) relative to each other.

11. Tracked vehicle as in one of claims 1 through 6, characterized in that the shaft (34, 36) of the drive unit (26, 28) is connected to the rotating component (60) of the electric motor and/or to the rotating component (60) of the drive train (30, 32) by means (62, 64) for compensating radial and axial motions of the shaft (34, 36) relative to the rotating component (50, 60) of the electric motor (18, 20) and of the drive train (30, 32).

12. Tracked vehicle as in one of claims 1 through 6, characterized in that the drive train (30, 32) comprises a planetary gear (56).

13. Tracked vehicle as in claim 12, characterized in that the shaft (34, 36) of the drive unit (26, 28) constitutes the shaft (34, 36) of the sunwheel (72) in the planetary gear (56).

14. Tracked vehicle as in one of claims 1 through 6, characterized in that the drive train (30, 32) comprises an axially offset drive train (76).

15. Tracked vehicle as in claim 14, characterized in that the axially offset drive train (76) and the electric motor (18, 20) constitute a single module.

16. Tracked vehicle as in one of claims 1 through 6, further characterized by having a wheelset that is vibrationally uncoupled from the vehicle pan (12).

17. Tracked vehicle as in claim 16, characterized in that at least some of the vibration-damping means (44) in the drive unit (26, 28) and in the wheelset constitute a single module.

18. Tracked vehicle as in one of the foregoing claims 1 through 6, further characterized by having a motion-limiting means that prevent large relative motions between the drive unit (26, 28) and the walls (40, 42) of the vehicle pan (12).

19. Tracked vehicle as in one of claims 1 through 6, characterized in that the vehicle pan (12) is provided with a cutout (46) associated with part of the drive unit (26, 28).

20. Tracked vehicle as claim 19, characterized in that the drive train (30, 32) extends at least partly into the vehicle pan (12).

21. Tracked vehicle as in one of claims 1 through 6, characterized in that the electric motor (18, 20) is entirely accommodated on one surface of the walls.

22. Tracked vehicle as in claim 8, characterized in that the projection components (74) that span the distance are part of the static component (48, 58) of the drive train (30, 32).

* * * * *